United States Patent
Shimamoto

(10) Patent No.: US 9,774,225 B2
(45) Date of Patent: Sep. 26, 2017

(54) MOTOR USED IN AN ENVIRONMENT HAVING A PRESSURE DIFFERENT FROM ATMOSPHERIC PRESSURE

(71) Applicant: NABTESCO CORPORATION, Tokyo (JP)

(72) Inventor: Mitsuru Shimamoto, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 174 days.

(21) Appl. No.: 14/740,962

(22) Filed: Jun. 16, 2015

(65) Prior Publication Data

US 2015/0381008 A1 Dec. 31, 2015

(30) Foreign Application Priority Data

Jun. 25, 2014 (JP) ................. 2014-130600

(51) Int. Cl.
*H02K 5/12* (2006.01)

(52) U.S. Cl.
CPC ................... *H02K 5/12* (2013.01)

(58) Field of Classification Search
CPC ........................................ H02K 5/12
USPC ..................................... 310/86–89
See application file for complete search history.

(56) References Cited

U.S. PATENT DOCUMENTS

| 2005/0073204 A1* | 4/2005 | Puterbaugh | H02K 5/10 310/89 |
| 2010/0034674 A1* | 2/2010 | Oota | F02M 37/08 417/410.1 |
| 2010/0111731 A1* | 5/2010 | Suzuki | F04D 5/002 417/423.7 |
| 2012/0027629 A1* | 2/2012 | Tanahashi | F04D 5/002 417/410.1 |

FOREIGN PATENT DOCUMENTS

JP 03-277148 A 12/1991

* cited by examiner

*Primary Examiner* — Naishadh Desai
(74) *Attorney, Agent, or Firm* — Pillsbury Winthrop Shaw Pittman LLP

(57) ABSTRACT

A motor (100) is used for driving a member in a container regulated to a pressure different from the atmospheric pressure. The motor (100) includes a rotor (10), a stator (18), and a case (34). The rotor (10) is located in an environment having a pressure different from the atmospheric pressure. The stator (18) is located opposedly to the rotor (10). The case (34) contains the rotor (10) and the stator (18). In the motor (100), a space in the case (34) opposed to the rotor (10) is filled with a resin.

6 Claims, 8 Drawing Sheets

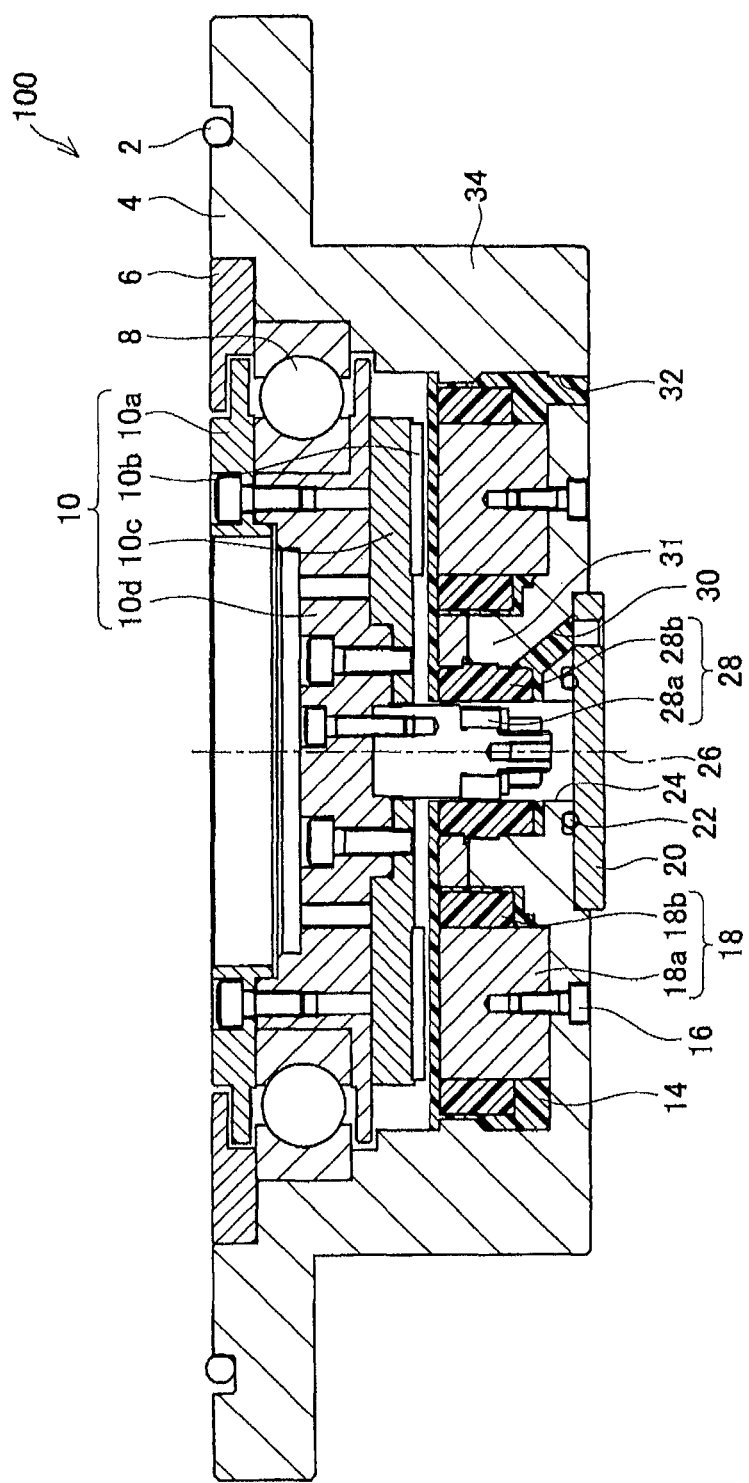
F I G. 1

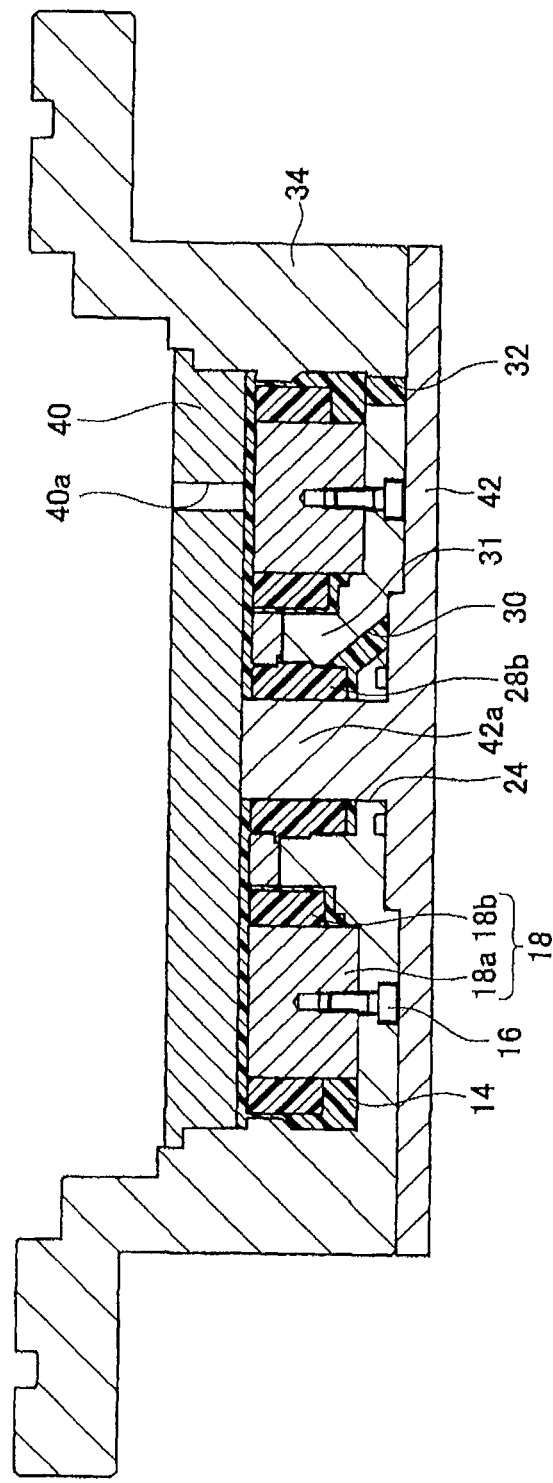
F I G. 3

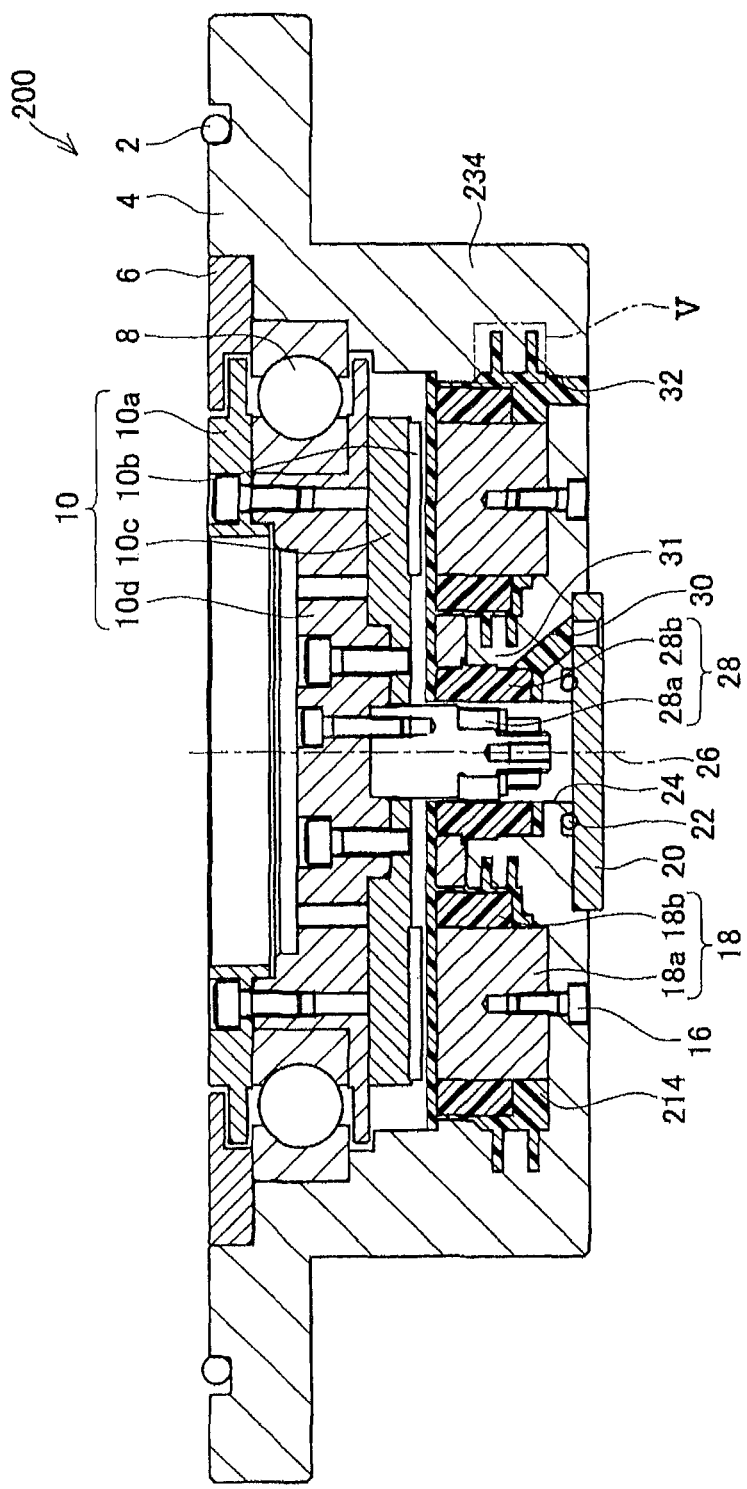
F I G. 4

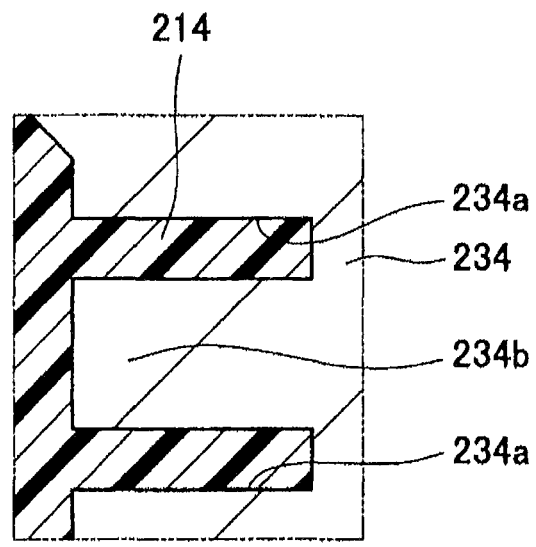
F I G. 5
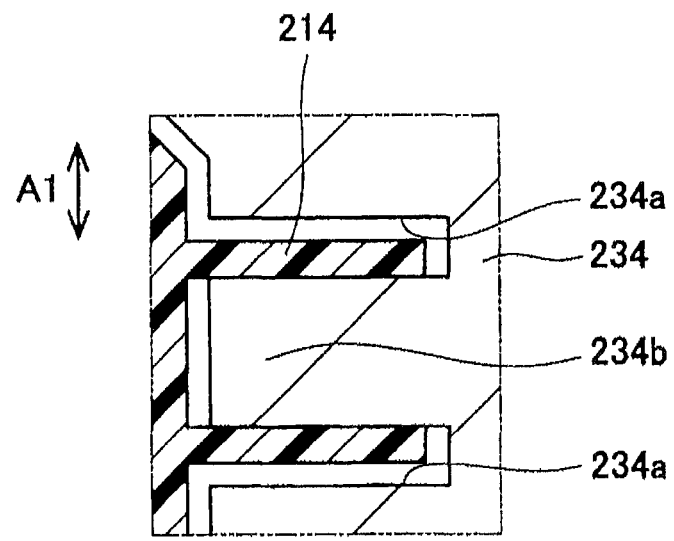
F I G. 6

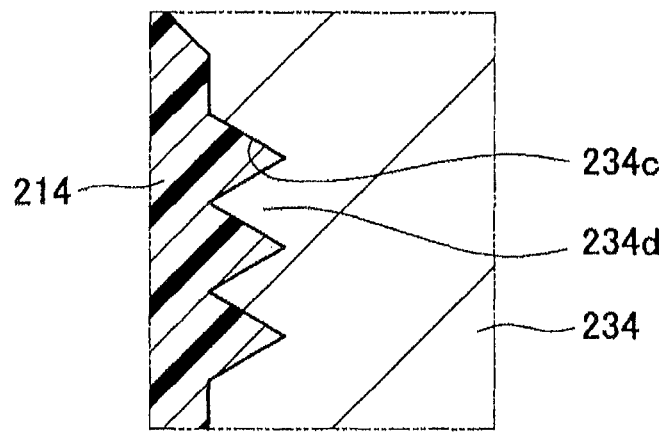
F I G. 7
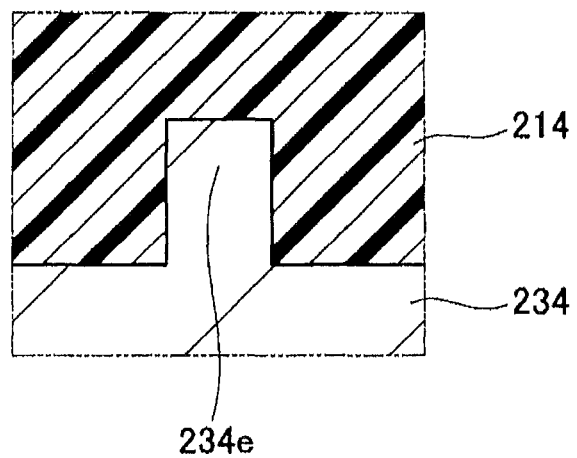
F I G. 8

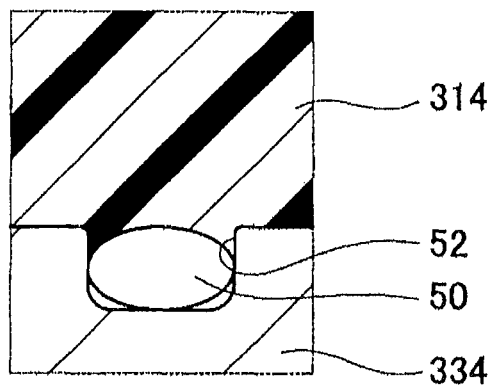
F I G. 10
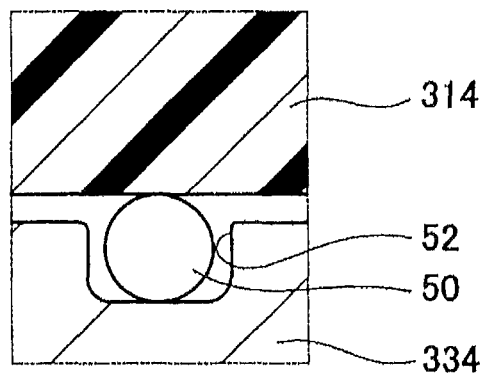
F I G. 11

MOTOR USED IN AN ENVIRONMENT HAVING A PRESSURE DIFFERENT FROM ATMOSPHERIC PRESSURE

CROSS-REFERENCE TO RELATED APPLICATIONS

This application is based upon and claims the benefit of priority from Japanese Patent Application No. 2014-130600, filed Jun. 25, 2014; the entire contents of which are incorporated herein by reference.

BACKGROUND OF THE INVENTION

Field of the Invention

This specification discloses a technique related to a motor. In particular, this specification discloses a technique related to a motor that is used in an environment having a pressure different from the atmospheric pressure.

Background Art

There is known a motor which is configured to drive a member in a container regulated to a pressure different from the atmospheric pressure, such as a vacuum container. Such a motor is used such that a part of the motor is located in a vacuum and another part of the motor is located in an atmospheric air. JP1991-277148A discloses a motor in which a partition wall is located between a rotor and stator. An environment in a vacuum container and an environment outside the vacuum container are blocked from each other by the partition wall. In the motor of JP1991-277148A, the rotor is located in a vacuum, and the stator is located in an atmospheric air.

In the motor of JP1991-277148A, a pressure difference is generated between a rotor side (vacuum side) of the partition wall and a stator side (atmospheric air side) thereof. This pressure difference applies a force that will deform the partition wall toward the rotor side. Thus, in case the partition wall should be deformed, it is necessary to increase a thickness of the partition wall, and/or it is necessary to elongate a distance between the rotor and the stator in order that the partition wall does not come into contact with the rotor, even if the partition wall is deformed. In either case, the distance between the rotor and stator is long, which increases the motor in size.

SUMMARY OF THE INVENTION

The object of this specification is to solve the above problem, and this specification discloses a technique achieving a small sized motor.

The motor disclosed in this specification is configured to drive a member in a container regulated to a pressure different from the atmospheric pressure. The motor includes: a rotor located in an environment having a pressure different from the atmospheric pressure; a stator located opposedly to the rotor; and a case containing the rotor and the stator. In the motor disclosed in this specification, a space in the case opposed to the rotor is filled with a resin.

According to the aforementioned motor, the space in the case opposed to the rotor is filled with a resin. Thus, even when a pressure of the environment in which the rotor is located differs from a pressure of the environment in which a member (e.g., stator) opposed to the rotor is located, it can be prevented that an interior and an exterior of the container communicate with each other through the motor so that a gas moves inward or outward the container. Namely, the motor enables that, without providing a partition wall or the like between the rotor and the stator, the rotor is located in the environment whose pressure (pressure different from the atmospheric pressure) is the same as the pressure in the container, and that the stator is located in the atmospheric air. Since it is not necessary for the motor to have a partition wall or the like, a distance between the rotor and the stator is not needed to be elongated. Thus, the motor can be reduced in size as compared with a conventional motor. In addition, since it is not necessary to provide a partition wall or the like between the rotor and the stator, an efficiency of the motor can be improved. Namely, a motor of reduced power loss can be realized.

The expression "a rotor is located in an environment having a pressure different from the atmospheric pressure" does not mean that the rotor is located in a container. The expression includes a case in which the rotor is located outside the container, with an inside of the container and a part where the rotor is located communicating with each other so that a pressure around the rotor is equal to a pressure (pressure different from the atmospheric pressure) in the container. The "pressure different from the atmospheric pressure" includes both a decompressed environment and a compressed environment. The "decompressed environment" includes a vacuum state and a substantially vacuum state, meaning an environment whose pressure is lower than the atmospheric pressure. A container whose internal pressure is lower than the atmospheric pressure is sometimes referred to as "decompression container". The "compressed environment" means an environment whose pressure is higher than the atmospheric pressure. A container whose internal pressure is higher than the atmospheric pressure is sometimes referred to as "pressure container".

BRIEF DESCRIPTION OF THE DRAWINGS

FIG. 1 is a sectional view of a motor of a first example.

FIG. 3 is a view showing the manufacturing step of the motor of the first example.

FIG. 4 is a sectional view of a motor of a second example.

FIG. 5 is a view showing in enlargement a part surrounded by the broken lines V in FIG. 4

FIG. 6 is a view for explaining a feature of the motor of the second example.

FIG. 7 is a partial sectional view of a modification example of the motor of the second example.

FIG. 8 is a partial sectional view of a modification example of the motor of the second example.

FIG. 10 is a view showing in enlargement a part surrounded by the broken lines X in FIG. 9.

FIG. 11 is a view for explaining a feature of the motor of the third example.

EMBODIMENT FOR CARRYING OUT THE INVENTION

Figure 2:
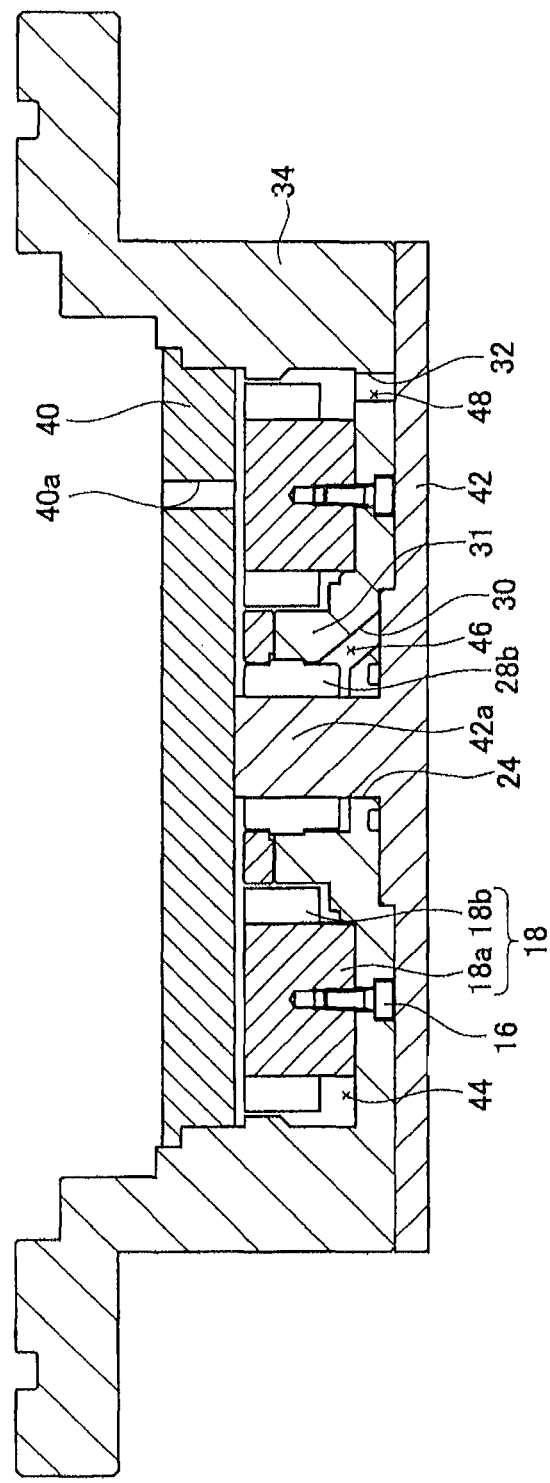
FIG. 2 is view showing a manufacturing step of the motor of the first example.

Some of technical features of a motor disclosed in this specification are described herebelow. The below-described matters have technical usability independently of each other.

The motor is configured to drive a member in a container regulated to a pressure different from the atmospheric pressure. The motor may drive a member in a container that is decompressed, or may drive a member in a container that is compressed. For example, the motor may be mounted on a vacuum container to drive a member in the vacuum container. Alternatively, the motor may be mounted on a pressure container to drive a member in the pressure container. In the below description, a pressure environment having a pressure different from the atmospheric pressure (environment in the container) is sometimes referred to as "first environment".

The motor may include a rotor, a stator, and a case. The motor may be of an axial gap structure or of a radial gap structure. In a case of an axial gap motor, the rotor may be located closer to a first environment side (container side) than the stator. In a case of a radial gap motor, the rotor may be located inside the stator. The rotor may be rotatably supported on the case through a bearing. The stator may be fixed to the case.

The rotor may include a support unit (support part, support member), a plate, a permanent magnet, and an output unit (output part, output member). The support unit may be rotatably supported on the case through a bearing. The plate may be fixed to the support unit. A through-hole may be provided in a central portion of the plate. The permanent magnet may be fixed to a face of the plate. On the face of the plate, the permanent magnet may be positioned so as to surround the central portion of the plate. The output unit may be fixed to the support unit. The output unit of the rotor may be exposed to the first environment. Alternatively, the entire rotor may be located in the first environment.

When the motor is mounted on a container regulated to a pressure different from the atmospheric pressure, the rotor may no be positioned inside the container beyond a face of the container on which the motor is mounted. Namely, when the motor is mounted on the container, the rotor may be positioned on a side opposite to the container with respect to the face of the container on which the motor is mounted. In addition, the plate may be fixed to the support unit on an opposite side of the container with respect to the support unit. A position detector (encoder) may be mounted on the rotor. The encoder may be fixed to the support unit through the through-hole in the plate.

The stator may include a core and a coil. The core may be fixed to the case. The coil may be located around the core. The stator may be located on a position opposed to the rotor, with a gap between the stator and the rotor. To be more specific, the stator may be located oppositely to the permanent magnet of the rotor. The stator may be located to surround the encoder.

The case may contain the rotor and the stator. A flange may be provided on an end of the case in a direction of a rotation shaft of the rotor. The flange may be fixed to a mounting face of the container. A first through-hole may be provided in a central portion of a bottom face of the case. An extension extending from the bottom face of the case along the rotation shaft may be provided around the first through-hole. Further, a second through-hole may be provided around the first through-hole. A plurality of second through-holes may be provided in the bottom face of the case. In addition, a bolt hole through which a bolt fixing the stator may be provided in the bottom face of the case.

A projection projecting from an area surrounding the same may be provided on an inner face of the case. The "projection projecting from an area surrounding the same" may be a projection between two parallel grooves formed in the inner face of the case, which projects from bottom faces of the grooves. Namely, the projection is defined based on a relationship relative to the area surrounding the projection, and thus is not necessarily limited to a case in which a protrusion is provided on the inner face of the case.

A space in the case opposed to the rotor may be filled with a resin. Due to the resin, it can be prevented that an interior and an exterior of the container communicate with each other through the motor. Specifically, the resin filling the space in the case can prevent that a gas moves inward or outward the container through a clearance in the case. Namely, even when the rotor is located in the first environment while the stator is located in the atmospheric air, a pressure in the container can be maintained without providing a partition plate or the like between the stator and the rotor. The resin may cover a face of the stator opposed to the rotor. To be more specific, the resin may be present in a clearance between the rotor and the stator. The resin may be either a thermoset resin or a thermoplastic resin.

The resin may cover the projection provided on the inner face of the case. Namely, the resin may be in contact with a top portion of the projection and a sidewall of the projection. In other words, the projection may be surrounded by the resin. The resin may possibly shrink during setting (curing) or after setting (curing). When the resin shrinks, a clearance may be possibly generated between the inner face of the case and the resin. However, since the resin shrinks as a whole, the resin covering the projection is going to move toward the projection. As a result, the resin covering the projection can maintain in contact with the projection. The projection provided on the inner face of the case can be regarded as a structure for maintaining the contact between the case and the resin, when the resin shrinks.

An O-ring may be located between the case and the resin. When the resin is filled into the case, the O-ring is constricted. Then, the O-ring is restored when the resin shrinks. Thus, even when a clearance is generated between the inner face of the case and the resin as the resin shrinks, the clearance between the inner face of the case and the resin can be sealed by the O-ring. In addition, a groove may be provided in the inner face of the case, and the O-ring may be located in the groove. In this case, a diameter of the O-ring may be larger than a depth of the groove.

In the below description, there is described an example in which the motor is mounted on a decompression container. However, the motor disclosed in this specification may be mounted on a pressure container.

First Example

A basic structure of a motor 100 is described with reference to FIG. 1. The motor 100 includes a rotor 10, a stator 18, and a case 34. The rotor 10 is contained in the case 34. The rotor 10 is rotatably supported on the case 34 through a bearing 8. The rotor 10 rotates around a rotation shaft 26. The rotor 10 includes an output unit 10a, a support unit 10d, a plate 10c, and a permanent magnet 10b. The output unit 10a and the plate 10c are fixed to the support unit 10d. In addition, a rotation unit 28a of an encoder 28 is fixed to the support unit 10d. The rotation unit 28a is fixed to the support unit 10d through a through-hole provided in a center of the plate 10c. The permanent magnet 10b is fixed to a face of the plate 10c. The permanent magnet 10b is located around the rotation unit 28a.

The stator 18 includes a core 18a and a coil 18b. The stator 18 is contained in the case 34. The stator 18 is fixed to a bottom face of the case 34 by bolts 16. The rotor 10 and the stator 18 are opposed to each other with a gap therebetween. Specifically, the core 18a is opposed to the permanent magnet 10b. The stator 18 is located to surround the encoder 28. The coil 18b is covered with a resin 14 described below.

The case 34 is provided with a flange 4. The flange 4 is provided on an end in a direction of the rotation shaft 26. By fixing the flange 4 to a mounting face of a decompression container (illustration omitted), the motor 100 is mounted on the decompression container. The motor 100 is mounted on the decompression container in such a manner that an O-ring 2 is located between the flange 4 and the mounting face of the decompression container. Thus, it can be prevented that an interior and an exterior of the decompression container communicate with each other through a clearance between the flange 4 and the decompression container. A regulation plate 6 that regulates a movement of the rotor 10 is located inside the flange 4. The regulation plate 6 is fixed to the case 34.

A first through-hole 24 and second through-holes 30 and 32 are provided in a bottom face of the case 34. The first though-hole 24 is provided in a center of the bottom face of the case 34, and is coaxial with the rotation shaft 26. The rotation unit 28a of the encoder 28 is located inside the first through-hole 24. An extension 31 is provided around the first through-hole 24. The extension 31 extends from the bottom face of the case 34 toward the rotor 10. A fixed unit 28b of the encoder 28 is fixed to the extension 31 of the case 34. The fixed unit 28b is covered with the resin 14 described below. A rotary encoder or a resolver encoder may be used as the encoder 28. The first through-hole 24 is sealed by a sealing plate 20. In addition, an O-ring 22 is located between the case 34 and the sealing plate 20. Due to the O-ring 22, an environment in the first through-hole 24 (decompressed environment) and an environment outside the case 34 (atmospheric air) are blocked from each other.

The second through-holes 30 and 32 are provided around the first through-hole 24. Wirings (illustration omitted) or the like can pass an interior and an exterior of the case 34 through the second through-holes 30 and 32. For example, a wiring connected to the stator 18 can reach the exterior of the case 34 through the second through-hole 30. In addition, a wiring connected to the encoder 28 can reach the exterior of the case 34 through the second through-hole 32. The second through-holes 30 and 32 are sealed by the resin 14.

The resin 14 is filled into a clearance between the inner face of the case 34 and the stator 18, an area surrounding the coil 18b of the stator 18, a clearance between the inner face of the case 34 and the fixed unit 28b of the encoder 28, an area surrounding the fixed unit 28b, and the second through-holes 30 and 32. In addition, the resin 14 covers faces of the stator 18 and the encoder 28 (fixed unit 28b). Namely, the resin 14 is filled into all the space in the case 34 opposed to the rotor 10, other than the first through-hole 24. The resin 14 is also present in a clearance between the rotor 10 and the stator 18. A face of the resin 14 on the side of the rotor 10 is flat. In FIG. 1, in order to clearly show the shapes of the coil 18b and the fixed unit 28b, the resin 14 covering the area around the coil 18b and the fixed unit 28b is hatched differently from the resin 14 filling the space where no component exists.

Steps of filling a resin into the case 43 are briefly described with reference to FIGS. 2 and 3. As shown in FIG. 2, the stator 24 is fixed to the case 34 by using the bolts 16, and the fixed unit 28b of the encoder 28 is mounted on the case. Then, a lower die 42 is mounted on the bottom face of the case 34, and an upper die 40 is mounted above the stator 24. The lower die 42 has a protrusion 42a to be fitted in the first through-hole 24. Since the protrusion 42a comes into contact with the upper die 40, a clearance is defined between the upper die 40 and the stator 18.

Thereafter, a pressure inside the case 34 is reduced. At this time, a temperature of the case 34 is regulated according to need. After that, as shown in FIG. 3, the resin 14 is filled into the case 34 from an injection hole 40a. Thus, a clearance 44 between the case 34 and the stator 18, a space around the coil 18b and the fixed unit 28b, and spaces 46 and 48 in the second through-holes 30 and 32 are filled with the resin. In other words, all the space in the case 34 opposed to the rotor 10, other than the first through-hole 24, is filled with the resin.

As shown in FIG. 1, an upper part of the case 34 (the side opposite to the stator 18 with respect to the rotor 10) is opened. Thus, when the motor 100 is mounted on the decompression container, an area surrounding the rotor 10 has the same pressure as that of the decompression container. Namely, when the decompression container is decompressed, the area surrounding the rotor 10 is also decompressed. Thus, it can be said that the rotor 10 is located in the same decompressed environment as that in the decompression container. On the other hand, the stator 18 is covered with the resin 14. Thus, although the inside of the decompression container is decompressed, an area surrounding the stator 18 will not be decompressed. Namely, it can be said that the stator 18 is located in an atmospheric air. In the motor 100, it can be said that the space that is not covered with the resin 14 is in the decompressed environment, and that the space that is covered with the resin 14 is in the atmospheric air.

An advantage of the motor 100 is described. As described above, the rotor 10 is located in the same decompressed environment as that in the decompression container. A component (stator 18 and so on) located in a part opposed to the rotor 10 is located in the atmospheric air. However, since the space in the case 34 opposed to the rotor 10 is filled with a resin, an environment in the decompression container (decompressed environment) and an environment outside the decompression container (atmospheric air) can be blocked from each other, without disposing a partition plate or the like between the rotor 10 and the stator 18. Since it is not necessary to ensure a space in which a partition plate or the like is located between the rotor 10 and the stator 18, a space between the rotor 10 and the stator 18 can be reduced, whereby a length of the motor 100 in the direction of the rotation shaft 26 can be made shorter.

Another advantage of the motor 100 is described. As described above, the flange 4 is provided on the end of the case 34, and the motor 100 is mounted on the decompression container by fixing the flange 4 to the mounting face of the decompression container. In addition, the rotor 10 is contained in the case 34, i.e., the rotor 10 does not project from an end face of the case 34. Thus, when the motor 100 is mounted on the decompression container, there is no possibility that a component constituting the motor 100 narrows a space in the decompression container. In addition, since the motor 100 has its length in the direction of the rotation shaft 26 that is shorter than a conventional one, a space around the decompression container can be enlarged as compared with a conventional one. The aforementioned advantages can also be obtained by below-described motors 200 and 300.

Second Example

A motor 200 is described with reference to FIGS. 4 and 5. The motor 200 is a modification example of the motor 100. A shape of a case 234 differs from that of the case 34 of the motor 100. Structures of the motor 200, which are substantially the same as those of the motor 100, are shown by the same reference numbers or reference numbers having the same last two digits as those of the motor 100, and description thereof is omitted.

As shown in FIG. 4, structures of the main components (rotor 10, stator 18 and so on) of the motor 200 are the same as those of the motor 100, excluding that a groove is provided in an inner face of the case 234. The groove 234a of the case 234 is described with reference to FIG. 5. As shown in FIG. 5, the inner face of the case 234 is provided with the groove 234a. Specifically, the two grooves 234a are adjacently provided in the direction of a rotation shaft 26. The grooves 234a extend around the rotation shaft 26 (see also FIG. 4). In addition, an extension 31 is provided with two adjacent grooves.

In the motor 200, a projection 234b is formed on the inner face of the case 234 by the adjacent grooves 234a and 234a. The grooves 234a are filled with a resin 214. Thus, an area surrounding the projection 234b is covered with the resin 214. For example, as shown in FIG. 6, when the resin 214 shrinks, the resin 214 decreases in volume so that a clearance is generated between the case 234 and the resin 214. Similarly, the resin 214 in each groove 234a shrinks, so that a clearance is generated between a sidewall of the groove 234a and the resin 214. However, since the resin 214 is going to shrink uniformly as a whole, a force of the resin 214 outside the groove 234a, which shrinks in the direction Al, urges the resin 214 in the groove 234a onto the sidewall of the groove 234a. Namely, the resin 214 shrinks so as to narrow a space where the projection 234b exists. Since the space where the projection 234b exists does not decrease in size, the contact between the resin 214 and the projection 234b is maintained accordingly.

Since the motor 200 has the case 234 provided with the projection 234b on the inner face thereof, the projection 234b and the resin 214 can continuously be in contact with each other, even when the resin 214 shrinks. Namely, even when a clearance is generated between the case 234 and the resin 214 at a lot of positions in the inner face of the case 234 because of the shrinkage of the resin 214, an environment in the decompression container (environment in which the rotor 10 is located) and an atmospheric air can be continuously separated from each other. As compared with the motor 100, the motor 200 can continuously separate the inside of the decompression container and the atmospheric air more reliably.

A modification example of the motor 200 is shown with reference to FIGS. 7 and 8. FIGS. 7 and 8 show a part of the case 234 which has a projection different in shape as that of the motor 200. In FIG. 7, a plurality of grooves 234c are formed in the case 234. Each groove 234c has shape that narrows in width toward a deep portion. A projection 234d formed by the adjacent grooves 234c and 234c has a width that narrows toward the inside of the case 234. Due to the projection 234d having such a shape, when the resin 214 shrinks, the resin 214 narrows a space where the projection 234d exists. Thus, even when the resin 214 shrinks, the projection 234d formed on the case 234 can continuously separate the environment in the compression container and the atmospheric air.

In FIG. 8, the bottom face of the case 234 is provided with a projection 234e. Also in this embodiment, the resin 214 shrinks such that the resin 214 narrows a space where the projection 234e exists. Also when the projection 234e is formed in the case 234, the environment in the compression container and the atmospheric air can be continuously separated from each other. Although the motor 200 shown in FIG. 4 has only the projection 234b, the projections 234d and 234e may be formed in place of the projection 234b or in addition to the projection 234b.

Third Example

A motor 300 is described with reference to FIGS. 9 and 10. The motor 300 is a modification example of the motor 200. A shape of case 334 differs from that of the case 234 of the motor 200. Structures of the motor 300, which are substantially the same as those of the motor 200, are shown by the same reference numbers or reference numbers having the same last two digits as those of the motor 200, and description thereof is omitted.

Figure 9:
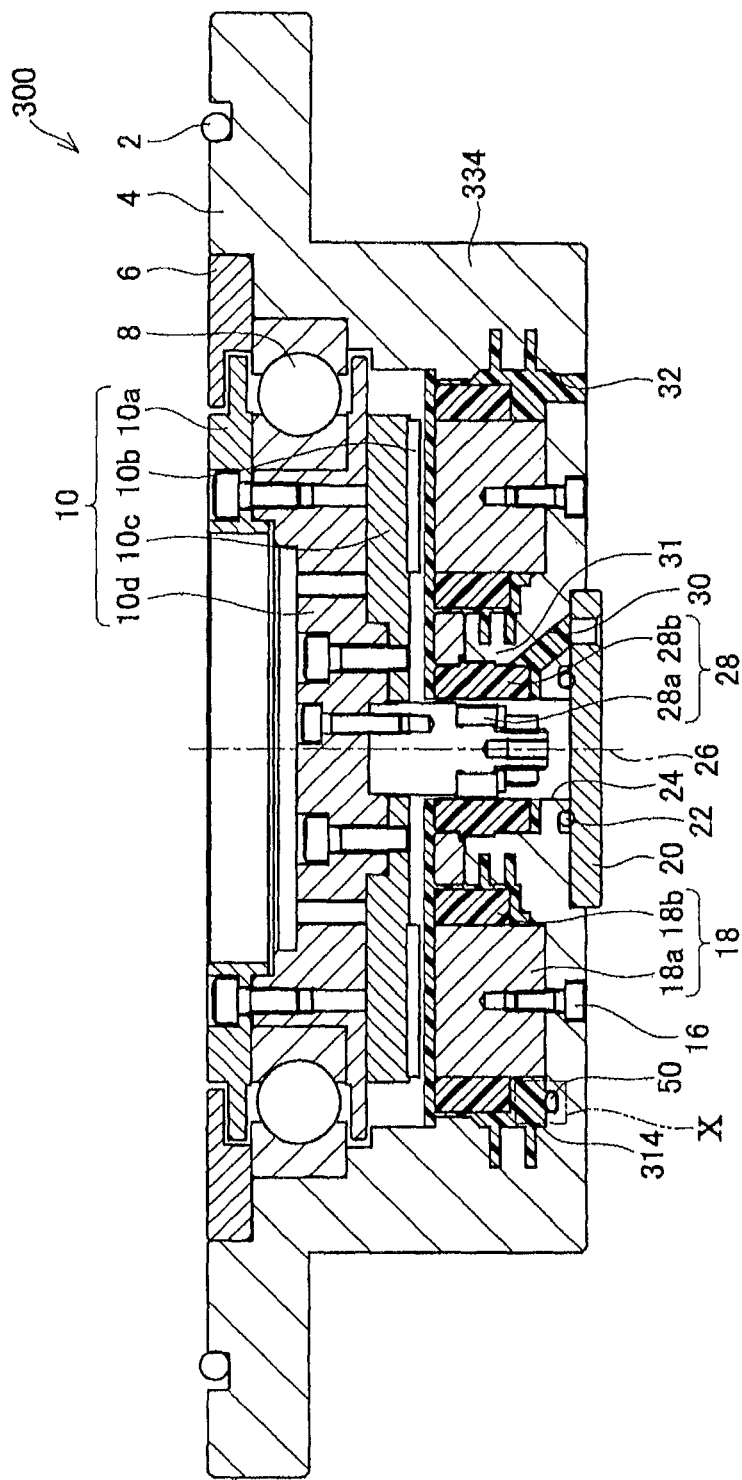
FIG. 9 is a sectional view of a motor of a third example.

As shown in FIGS. 9 and 10, a groove 52 is formed in a bottom part of the case 334, and an O-ring 50 is located in the groove 52. As shown in FIG. 10, the O-ring 50 is deformed in the groove 52. To be more specific, when a resin 314 is filled, the O-ring 50 located in the groove 52 is collapsed by a pressure for filling the resin 314.

As shown in FIG. 11, when the resin 314 shrinks, a clearance is generated between the case 334 and the resin 314 at a part where the O-ring 50 is not located. However, in a part where the O-ring 50 is located, the O-ring 50 is restored in accordance with the shrinkage of the resin 314, so that the O-ring 50 seals the clearance between the resin 314 and the case 334. Thus, even when a clearance is generated between the case 334 and the resin 314 at a lot of positions in the inner face of the case 334 because of the shrinkage of the resin 314, an environment in the decompression container and an atmospheric air can be continuously separated from each other. As shown in FIG. 9, similarly to the motor 200, the motor 300 has a projection on an inner wall of the case 334 (see also FIG. 4). Thus, as compared with the motors 100 and 200, the motor 300 can continuously separate the inside of the decompression container and the atmospheric air furthermore reliably. In addition, in a motor (e.g., motor 100) that does not have a projection on an inner wall of a case, the groove 52 shown in FIGS. 9 and 10 may be formed, and the O-ring 50 may be located in the groove 52. In other words, as long as the O-ring 50 is located in the groove 52, the projection formed on the inner wall of the case 334 may be deleted.

In the motor of the above examples, the rotor is located in the decompressed environment, and the space in the case opposed to the rotor is filled with the resin. Namely, the motor blocks the decompressed environment (environment in the decompression container) from the atmospheric air. For example, if the entire motor is located in the decompression container, it is not necessary that the space opposed to the rotor is filled with the resin. However, when the motor is located in the decompression container, a space in the decompression container is made narrow. The motor in the above examples can block the environment in the decompression chamber from the atmospheric air, without narrowing the space in the container. Also when the motor in the above embodiments is mounted on a pressure container (container achieving a compressed environment in which an inside pressure is higher than the atmospheric pressure), an environment in the pressure chamber can be blocked from an atmospheric air without narrowing a space in the container.

Although the concrete examples of the present invention have been described in detail, they are mere examples and do not limit the claims. The claims include the above concrete examples that are variously modified or changed. The technical elements described in this specification or the drawings have technical usability by themselves or in combination, and are not limited to the combination of the claims upon the filing of this invention. The technique given by way of example in this specification or the drawings simultaneously achieves a plurality of objects. To achieve one of these objects itself has technical usability.

The invention claimed is:

1. A motor comprising:
 a rotor located in an environment having a pressure different from an atmospheric pressure, the rotor being configured to rotate about a rotation axis;
 a stator located oppositely to the rotor in the direction of the rotation axis of the rotor; and
 a case containing the rotor and the stator;
 wherein the motor is configured to drive a member in a container regulated to a pressure different from the atmospheric pressure,
 wherein the case is provided with an opening facing in a direction of the rotation axis of the rotor, and the case has a flange extending outwardly from a periphery of the opening and in a direction perpendicular to the rotation axis of the rotor, the flange being on a rotor side of the case and configured to be fixed to a mounting face of the container, and
 wherein a space in the case opposed to the rotor, in the direction of the rotation axis of the rotor, is filled with a resin so as to seal the environment in which the rotor is located from the atmospheric pressure.

2. The motor according to claim 1, wherein
 an inner face of the case is provided with a structure that maintains a contact between the case and the resin when the resin shrinks.

3. The motor according to claim 1, wherein
 an inner face of the case is provided with a projection projecting from an area surrounding the same toward the resin.

4. The motor according to claim 1, wherein
 an O-ring is located between the case and the resin, and the O-ring is in contact with both of the case and the resin.

5. The motor according to claim 4, wherein
 the inner face of the case is provided with a groove, and the O-ring is located in the groove.

6. The motor according to claim 1, wherein the motor has an axial gap structure, and wherein the resin is located between the stator and the rotor in the direction of the rotation axis of the rotor.

* * * * *